United States Patent [19]

Law

[11] Patent Number: 6,164,446
[45] Date of Patent: Dec. 26, 2000

[54] DATA DISC BOX

[75] Inventor: Man Ming Law, Shame Tseng, The Hong Kong Special Administrative Region of the People's Republic of China

[73] Assignee: Media State Group Ltd., Tortola, Virgin Islands (Br.)

[21] Appl. No.: 09/528,982

[22] Filed: Mar. 20, 2000

[30] Foreign Application Priority Data

Feb. 25, 1999 [HK] The Hong Kong Special Administrative Region of the People's Republic of China .............................. 00101159

[51] Int. Cl.[7] .................................................. B65D 85/57

[52] U.S. Cl. ........................ 206/308.1; 206/310; 206/493

[58] Field of Search ................................ 206/307, 308.1, 206/309–312, 493, 477, 480; 369/290–292

[56] References Cited

U.S. PATENT DOCUMENTS

| | | | |
|---|---|---|---|
| 4,771,890 | 9/1988 | Hofland et al. | 206/308.1 |
| 5,638,952 | 6/1997 | Kim | 206/308.1 |
| 5,788,068 | 8/1998 | Fraser et al. | 206/310 |
| 5,829,582 | 11/1998 | Ippolito et al. | 206/308.1 |
| 5,944,181 | 8/1999 | Lau | 206/308.1 |
| 5,988,375 | 11/1999 | Chang | 206/308.1 |
| 5,996,788 | 12/1999 | Belden, Jr. et al. | 206/310 |

*Primary Examiner*—Luan K. Bui
*Attorney, Agent, or Firm*—Leydig, Voit & Mayer, Ltd.

[57] ABSTRACT

A data disc box for holding a data disc has a body including first and second panels inter-connected for pivoting apart and close together. The first panel includes at least two hooks for engaging an outer edge of the disc on opposite sides to hold the disc in position on the first panel, and a spring for biasing the disc away from the first panel against the action of the hooks. The hook has a part for actuation or pressing to move the overall hook backwards, thereby releasing the disc for movement by the spring.

12 Claims, 2 Drawing Sheets

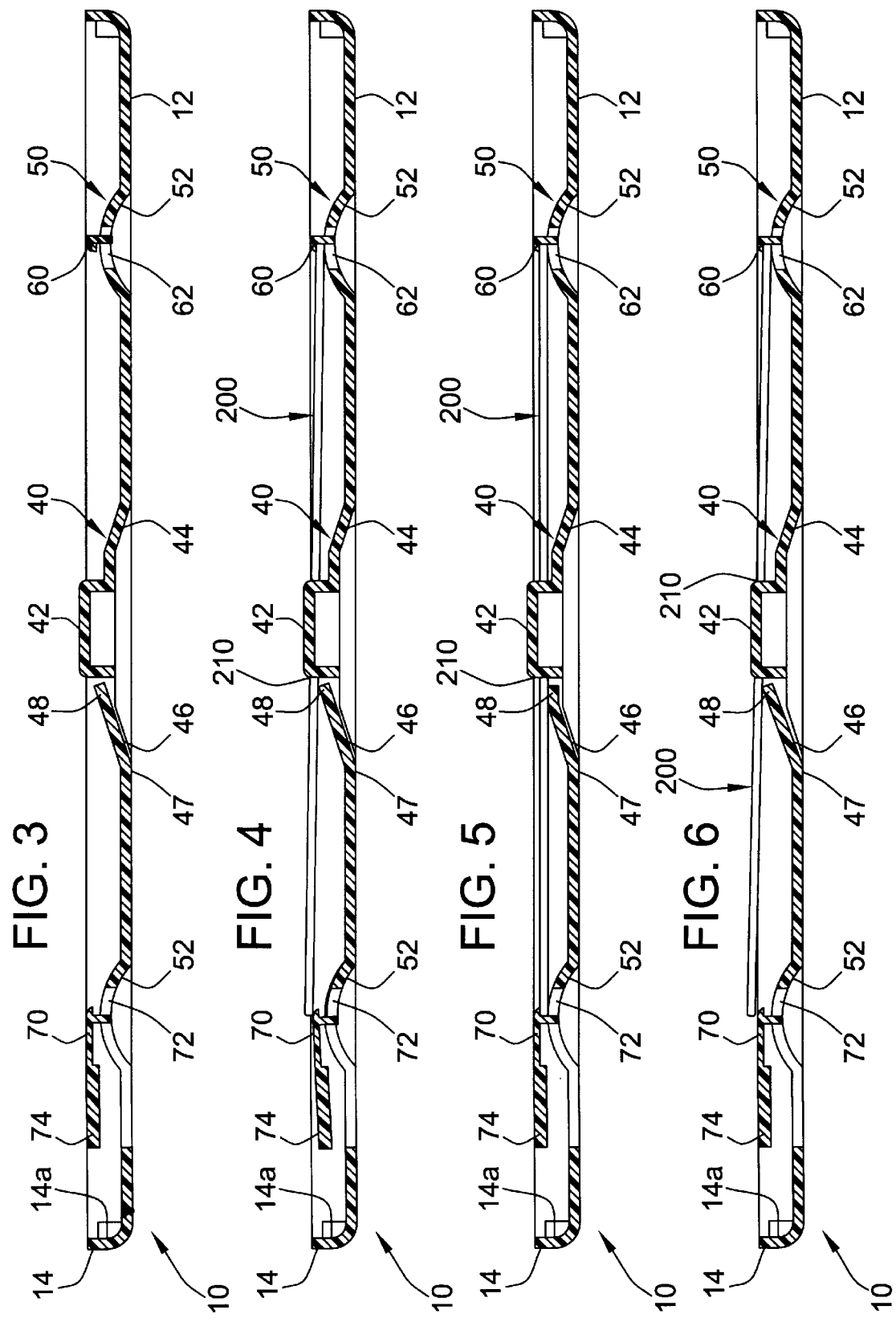

DATA DISC BOX

The present invention relates to a box for holding a data disc, such as a DVD, VCD or the like.

BACKGROUND OF THE INVENTION

Data discs, such as DVD, VCD, CD and CD-ROM discs, are in abundant use, which are usually stored in a flat plastic box. Most of the existing storage boxes have a ring a friction member for engaging the disc by a centre hole, thereby holding the disc by friction. Pressing of the friction members will release the disc. Through repeated pressings and, in particular, pressings too strongly, such members will often be broken and become inoperative.

The invention seeks to mitigate or at least alleviate such a problem by providing an improved data disc box.

SUMMARY OF THE INVENTION

According to the invention, there is provided a data disc box for holding a data disc, which box has a body comprising first and second panels inter-connected for pivoting apart and close together, the first panel comprising at least two hooking members for engaging an outer edge of the disc on opposite sides to hold the disc in position on the first panel, and a resilient member for biasing the disc away from the first panel against the action of the hooking members, a first of the hooking members being manually movable backwards to release the disc for movement by the resilient member.

Preferably, the first panel includes a raised formation for engaging a centre hole of the disc against lateral movement of the disc.

More preferably, the resilient member is provided adjacent one side of the raised formation.

More preferably, the hooking members are provided on opposite sides with respect to the raised formation, and the resilient member is provided adjacent the side of the raised formation nearer to the first hooking member.

Further more preferably, the hooking members and the resilient member are arranged in a straight line.

In a preferred embodiment, the resilient member is a leaf spring.

More preferably, the leaf spring has a free end reaching immediately close to one side of the raised formation.

It is preferred that the first hooking member has a part for actuation to move the overall hooking member backwards to release the disc.

More preferably, the part extends rearwards from the first hooking member and is arranged to be pressed for actuation.

In a preferred embodiment, the first panel includes an annular raised formation for supporting the disc in position.

More preferably, the hooking members are located on the annular raised formation.

It is preferred that the members and formation(s) be integral with the first panel.

BRIEF DESCRIPTION OF DRAWINGS

The invention will now be more particularly described, by way of example only, with reference to the accompanying drawings, in which:

FIG. 3 is a cross-sectional side view of the base tray of FIG. 1, taken along lines III—III;

FIG. 4 is a cross-sectional side view corresponding to FIG. 3, showing the base tray about to receive a data disc;

FIG. 5 is a cross-sectional side view corresponding to FIG. 4, showing the base tray holding the data disc in position; and FIG. 6 is a cross-sectional side view corresponding to FIG. 5, showing how the data disc is released from the base tray.

DETAILED DESCRIPTION OF PREFERRED EMBODIMENT

Figures 1, 2:
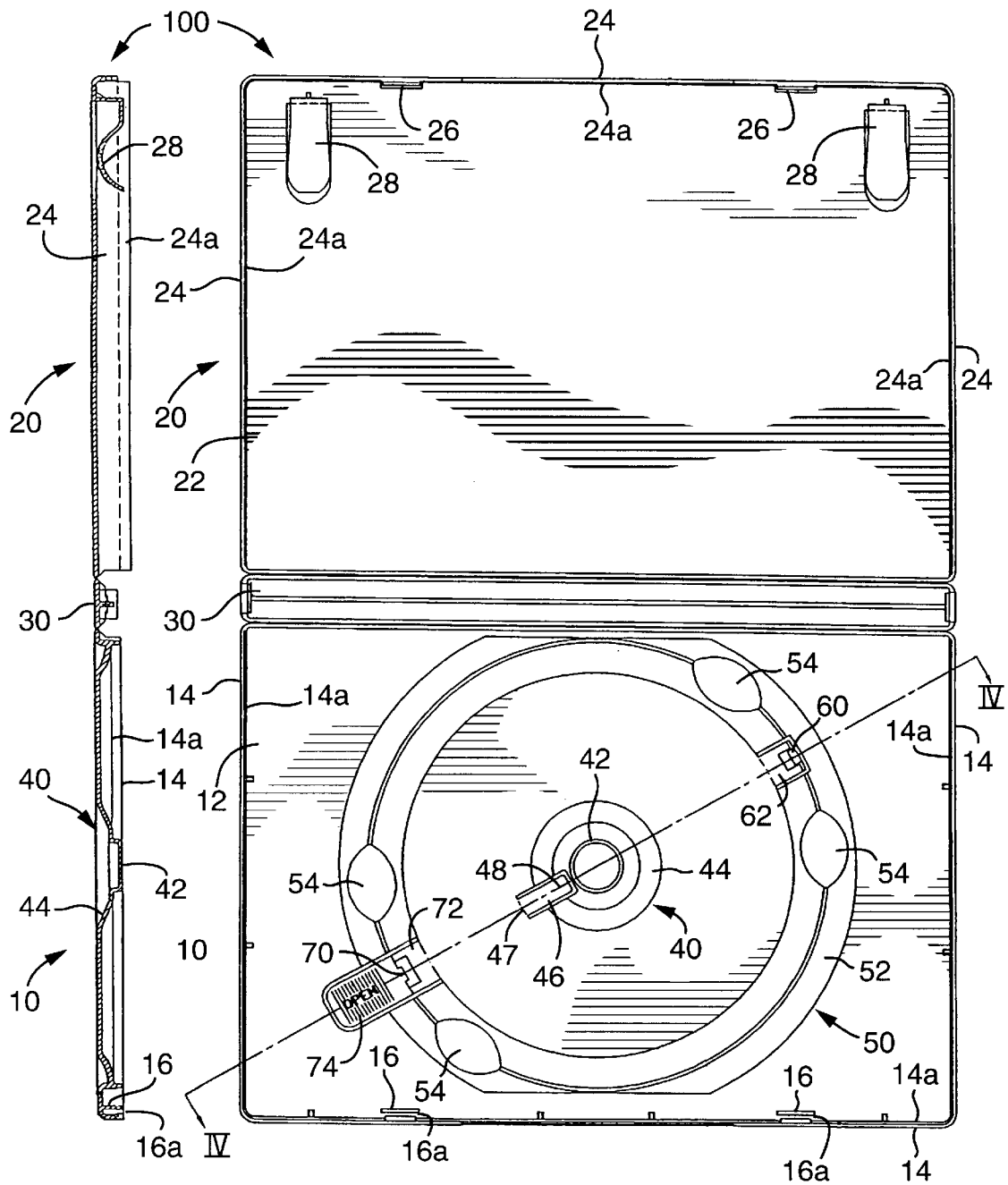
FIG. 1 is a top plan view of an embodiment of a data disc box in accordance with the invention, the box being including a base tray and a lid tray shown open flat.
FIG. 2 is a cross-sectional side view of the box of FIG. 1.

Referring to the drawings, there is shown a data disc box 100 embodying the invention for holding a data disc 200, which box 100 has a transparent plastic body including a pair of inter-connected rectangular panels. The first panel is a base tray 10. The second panel is a lid tray 20 which has substantially the same size as and is connected integrally to the base tray 10 by means of an elongate web 30 to form a one-piece structure. The web 30 extends between and along adjacent longer sides of the base and lid trays 10 and 20 and acts as a hinge between them. The lid tray 20 is pivotable onto the base tray 10 (resulting in a closed condition for the box 100) and open from the base tray 10 (resulting in an open condition).

The base tray 10 has a bottom wall 12 and a short peripheral wall 14 extending along the three unconnected sides of the bottom wall 12. The peripheral wall 14 has an inner side that is shorter than the outer side to form a rim-receiving space 14A along the free edge of the wall 14. The lid tray 20 has a top wall 22 and a short peripheral wall 24 extending along the three unconnected sides of the top wall 22. The peripheral wall 24 has an inner side that is taller than the outer side to form a rim 24A along the free edge of the wall 24. When the lid tray 20 is folded to lie against the base tray 10, the rim 24A is received, fit within the rim-receiving space 14A, thereby forming a flat box which is closed on four sides by the peripheral walls 24 and 14 and the web 30.

On the unconnected longer side of the base tray bottom wall 12, a pair of upstanding lugs 16 is located close to the inner side of the peripheral wall 14 to form respective gaps 16A with the wall 14. On the unconnected longer side of the lid tray top wall 22, the peripheral wall 24 is displaced slightly inwards to form respective parts 26. The parts 26 are in alignment with and press-fit into the corresponding gaps 16A when the lid tray 20 is folded to lie against the base tray 10, thereby holding the box closed.

In the base tray 10, the bottom wall 12 includes a raised circular central portion 40 and a raised annular portion 50 concentrically around the central portion 40 for supporting the data disc 200 in position.

The central portion 40 has a central boss 42 and an annular slope 44 extending downwardly and outwardly from the boss 42. The boss 42 has a diameter slightly smaller than that of a centre hole 210 of the data disc 200, for engaging the hole 210 against lateral movement of the disc 200 (FIG. 4). A radially-extending part of the slope 44 is unattached on opposite lateral sides and an inner end to form an integral leaf spring 46. The spring 46 is slightly elevated from the slope 44, having a fixed end 47 which is connected to the bottom wall 12 just outside the slope 44 and a free end 48 which points upwards along the slope 42 and reaches immediately close to one side of the boss 42. When viewed from above, the spring 46 extends along diameter III—III and is inclined at an angle, almost diagonally, with respect to the sides of the bottom wall 12.

The annular portion 50 has a part-circular cross-sectional wall 52 and a diameter measured across opposite highest points of the wall 52 slightly larger than the overall diameter of the data disc 200. A pair of hooks 60 and 70 is integrally formed at diametrically opposite highest points of the wall 52, lying on diameter III—III and having respective radially inwardly extending/projecting hooking portions for engaging the data disc 200 (FIG. 4). The spring 46 is provided on the side of the boss 42 nearer to the second hook 70, and the hooks 60 and 70 and the spring 46 are arranged along a straight line.

Each hook 60/70 has a respective enlarged rectangular root 62/72 provided by a part of the inner side of the annular portion wall 52, which is unattached on opposite lateral sides and outer side such that the hook 60/70 is resiliently pivotable. Unlike the first hook 60, the second hook 70 is manually releasable and incorporates a rearwardly extending integral tab 74 which is provided for actuation or pressing by a finger or thumb to pivot and thus release the overall hook 70.

In use of the data disc box 100, the data disc 200 is initially placed centrally over the central and raised portions 40 and 50 of the base tray 10. The disc 200 is then pressed downwards at opposite sides adjacent the hooks 60 and 70 (FIG. 4), whereby the hooks 60 and 70 are forced to pivot slightly apart for, upon return, engaging the disc 200 by its outer edge (FIG. 5). It should be noted that while the disc 200 is held in position, the relevant side of the centre hole 210 compresses the spring 46 downwards. The lid tray 20 is finally folded onto the base tray 10 to form a closed flat box, as described above, containing and protecting the disc 200.

When the box 100 is opened, the disc 200 may be released from the base tray 10 by pressing the tab 74 to pivot the hook 70, whereby the spring 46 will pop the disc 200 up (FIG. 6) for subsequent removal. The underneath annular portion 50 includes two pairs of opposite recesses 54 to facilitate gripping of the disc 200 by the edge.

The lid tray 20 may include a pair of integral clips 28, on the top wall 22 near the unconnected longer side, for holding a paper insert to show the content of the data disc 200.

It is envisaged that more than two of the hooks 60 and 70 may be provided on the base tray 10 for holding the disc 200 in a relatively more stable manner.

The data disc box of the subject invention is useful, in general, to hold all types of audio/visual/computer data discs such as DVD, VCD, CD and CD-ROM discs.

The invention has been given by way of example only, and various modifications of and/or alterations to the described embodiment may be made by persons skilled in the art without departing from the scope of the invention as specified in the appended claims.

What is claimed is:

1. A data disc box for holding a data disc, comprising:

first and second panels interconnected for pivoting apart and close together, the first panel comprising
   at least two hooking members for engaging an outer edge of a disc on opposite sides to hold the disc in position on the first panel, and
   a resilient member for biasing the disc away from the first panel against the hooking members, a first of the hooking members being manually movable backwards to release the disc for movement by the resilient member.

2. The data disc box as claimed in claim 1, wherein the first panel includes a raised formation for engaging a centre hole of the disc against lateral movement of the disc.

3. The data disc box as claimed in claim 2, wherein the resilient member is located adjacent one side of the raised formation.

4. The data disc box as claimed in claim 2, wherein the hooking members are located on opposite sides with respect to the raised formation, and the resilient member is located adjacent the side of the raised formation nearer the first hooking member.

5. The data disc box as claimed in claim 4, wherein the hooking members and the resilient member are arranged along a straight line.

6. The data disc box as claimed in claim 2, wherein the resilient member is a leaf spring.

7. The data disc box as claimed in claim 6, wherein the leaf spring has a free end reaching close to one side of the raised formation.

8. The data disc box as claimed in claim 1, wherein the first of the hooking members has a part actuatable to move the first of the hooking members backwards to release the disc.

9. The data disc box as claimed in claim 8, wherein the part extends from the first of the hooking members and is pressed for actuation.

10. The data disc box as claimed in claim 1, wherein the first panel includes an annular raised formation for supporting the disc.

11. The data disc box as claimed in claim 10, wherein the at least hooking members are located on the annular raised formation.

12. The data disc box as claimed in claim 1, wherein the at least two hooking members and formation are integral with the first panel.

* * * * *

UNITED STATES PATENT AND TRADEMARK OFFICE
CERTIFICATE OF CORRECTION

PATENT NO. : 6,164,446
DATED : December 26, 2000
INVENTOR(S) : Man Ming Law

It is certified that error appears in the above-identified patent and that said Letters Patent is hereby corrected as shown below:

Item [30] Foreign Application Priority Data:
Feb. 25, 2000    The Hong Kong Special Adminstration Region of People's Republic of China    00101159

Signed and Sealed this

Twenty-first Day of August, 2001

Attest:

*Nicholas P. Godici*

NICHOLAS P. GODICI
*Acting Director of the United States Patent and Trademark Office*

*Attesting Officer*